United States Patent [19]

Wakasa et al.

[11] 4,159,198

[45] Jun. 26, 1979

[54] METHOD OF MAKING A NOZZLE PLATE FOR SPINNING GLASS FIBERS MADE OF SPECIAL ALLOY AND RESULTING NOZZLE PLATE

[75] Inventors: Isao Wakasa; Toshio Noji; Sumiko Takahashi, all of Fukushima, Japan

[73] Assignee: Nitto Boseki Co., Ltd., Fukushima, Japan

[21] Appl. No.: 851,885

[22] Filed: Nov. 16, 1977

Related U.S. Application Data

[63] Continuation of Ser. No. 727,801, Sep. 29, 1976, abandoned.

[51] Int. Cl.$^2$ .............................................. C03B 37/02
[52] U.S. Cl. .................................................. 65/1; 65/2; 65/374 M; 75/172 G
[58] Field of Search ........... 75/172 G; 65/1, 2, 374 M

[56] References Cited

U.S. PATENT DOCUMENTS

| 1,357,272 | 11/1920 | Carter | 75/172 G |
|---|---|---|---|
| 1,378,996 | 5/1921 | Carter | 75/172 G |
| 1,515,464 | 11/1924 | Dietz | 75/172 G |
| 3,672,880 | 6/1972 | Darling et al. | 75/172 G |
| 4,088,467 | 5/1978 | Shono et al. | 65/375 M X |

FOREIGN PATENT DOCUMENTS

| 763160 | 12/1956 | United Kingdom | 65/1 |
|---|---|---|---|
| 1155563 | 6/1969 | United Kingdom. | |
| 1242921 | 8/1971 | United Kingdom | 65/1 |
| 1318201 | 5/1973 | United Kingdom. | |

OTHER PUBLICATIONS

Silikattechnik 18, pp. 211–214, 1967, Katzschmann.
Platinum Metals Rev., pp. 54–59, 92–99, 130–135, Selman et al., 1966, 1965.

*Primary Examiner*—Robert L. Lindsay, Jr.
*Attorney, Agent, or Firm*—Jay L. Chaskin

[57] ABSTRACT

An alloy for a nozzle plate for spinning glass fibers which contains between 82 and 92 percent by weight platinum, between 3 and 10 percent by weight gold, and between 3 and 12 percent by weight palladium. This alloy displays an excellent resistance to wetting by molten glass, a superior machinability, and a superior durability.

8 Claims, No Drawings

METHOD OF MAKING A NOZZLE PLATE FOR SPINNING GLASS FIBERS MADE OF SPECIAL ALLOY AND RESULTING NOZZLE PLATE

This is a continuation of application Ser. No. 727,801, filed Sept. 29, 1976, now abandoned.

The present invention relates to an alloy for a nozzle plate for spinning glass fibers, and particularly to an alloy by the use of which there can be manufactured a flat plate shaped bushing nozzle which is substantially free from wetting by molten glass and enabling formation of a very large number of nozzle holes per unit area.

Representative of conventional nozzle plates for producing glass fibers is a flat nozzle plate made of a platinum-rhodium alloy. This flat nozzle plate is manufactured by simply machining nozzle holes from about 1.5 to about 3 mm. in diameter in a flat plate made of a platinum-rhodium alloy. In this flat nozzle plate made of a platinum-rhodium alloy, the contact angle between the nozzle plate and the molten glass is small, namely, the nozzle plate is wetted heavily by the molten glass. After the appearance of this flat nozzle plate, there was developed a nozzle plate made of a platinum-gold-rhodium alloy in which the contact angle between the nozzle plate and the molten glass is larger than that of the former nozzle plate, thus the nozzle plate is wetted by the molten glass to a lesser extent than in the former nozzle plate. However, in both of the two types of nozzle plates described above there is still encountered a problem. When a pitch for the nozzle holes is made narrower and if one of the filaments flowing through the nozzle holes is cut, the molten glass bead formed by the molten glass which has passed through the nozzle hole tends to spread over a large area of the surface of the nozzle plate, and thus cuts the other filaments flowing through the nozzle holes adjacent to the nozzle hole for said first cut filament. This adverse phenomenon spreads in the manner of a chain reaction, with the result that all the filaments are cut, and the surface of the nozzle plate is covered with molten glass which has passed through the nozzle holes. Once this situation has been established, it becomes very difficult to separate each filament from the combined bead of molten glass, that is, to bring back the original state in which the filament of molten glass discharged from one nozzle hole flows smoothly and separately without disturbing the molten glass discharged from the other nozzle holes, whereby all of the filaments of the molten glass discharged from each individual nozzle hole form independently flowing filaments. Particularly, in cases where there is used a pitch for the nozzle holes of 5 mm. or less, even a skilled operator cannot maintain independent flows of filament by the use of conventional methods whereby each filament is successively formed through respective nozzles. Further, the platinum-gold-rhodium alloy is brittle, and is inferior both in durability and machinability. For instance, it was found that a nozzle plate made of the alloy and having about 50 nozzle holes per square centimeter was bent outwardly and deformed after a long period of use. And a nozzle plate made of the above alloy and having 1000 or more nozzle holes needed reinforcing ribs for preventing deformation. In this case there were problems when forming the reinforcing ribs by welding, small cracks occurred on account of thermal expansion, and these small internal cracks were further enlarged by mechanical shocks and/or by thermal expansion and contraction resulting in leakage of the molten glass.

The reason for these drawbacks is that gold and rhodium show very low solid solubility with each other and the larger the amount of gold or rhodium, the more difficult it is to form a single complete solid solution.

It has been pointed out that the fact that, in the platinum-gold-rhodium system, the resistance to wetting by the molten glass filament increases when the alloy contains gold in an amount between 3 and 4 percent by weight which is near the solid solubility limit for gold, consequently, it is considered to be the effect of gold which is very less soluble in a platinum-rhodium base alloy in the solid state. In view of the situation described above, it has been generally accepted that it is fairly difficult to produce a single complete solid solution which affords both an excellent resistance to wetting by molten glass and a superior machinability. A nozzle plate made of graphite or boron nitride is superior to the above described nozzle plates made of alloys in terms of the resistance to wetting by the molten fiber glass. However, a nozzle plate made of graphite cannot be used in air since the graphite is liable to be oxidized. And with a nozzle plate made of boron nitride it is difficult to attain a uniform temperature distribution because the boron nitride is an insulator. A nozzle plate made of boron nitride also has a disadvantage that the contact angle between the nozzle plate and the molten glass is apt to vary depending upon the state of the surface finish of the nozzle plate.

An object of the present invention is to provide an alloy for a nozzle plate for spinning glass fibers which has an excellent resistance to wetting by molten glass, a superior machinability and a superior durability.

Another object of the present invention is to provide an alloy for a nozzle plate for spinning glass fibers by the use of which there can be manufactured a nozzle plate in which a pitch for nozzle holes of 2 mm. or less can be used, and a large number of nozzle holes can be machined in the nozzle plate.

Still another object of the present invention is to provide an alloy for a nozzle plate for spinning glass fibers by the use of which there can be manufactured a nozzle plate to which reinforcing plates can be welded readily, and which can be used for a long period of time.

In the course of research and development of the present invention, research was conducted to obtain a material for manufacturing nozzle plates, which is free from wetting by molten glass, or is hardly wetted by the molten glass, and also has a superior machinability, and with the use of which there can be manufactured a nozzle plate having an increased number of nozzle holes. It was made possible, in accordance with the present invention and by the use of a platinum-gold-palladium system alloy, to manufacture a nozzle plate which is able to have several thousands nozzle holes having therein a pitch of 2 mm. or less, and which can be used for a long period of time due to the fact that reinforcing plates can be readily welded to the nozzle plate. In starting the research, consideration was given to the facts that gold-palladium system binary alloys form complete solid solutions. It was also observed during the course the research that, in a nozzle plate made of an alloy containing 80 percent by weight gold and 20 percent by weight palladium the contact angle between the alloy and the molten glass has a large value of 80 degrees, and that the nozzle plate made of the above binary alloy still tends to melt when used for spinning glass fibers, because the above alloy has a low melting point of about 1380° C.

It was gathered through careful consideration that platinum-gold-palladium system alloys should form solid solution more readily than platinum-gold-rhodium system alloys, and the contact angles between the alloy system and molten glass might be substantially equal to the contact angles between the platinum-gold-rhodium system alloys and molten glass and further the alloy should have superior workability and durability. As the result of the research, it was found that an alloy containing between 82 and 92 percent by weight platinum, between 3 and 10 percent by weight gold, and between 3 and 12 percent by weight palladium forms a single complete solid solution, and has an excellent resistance to wetting by molten glass and a superior machinability, and a nozzle plate made of the above alloy has a superior durability.

In the alloy according to the present invention having the chemical composition described above, the resistance to wetting by molten glass increases with the increased content of gold. The rate of increase in the contact angle between the above alloy and the molten glass, however, becomes less with the increase in gold content, and gradually close to a fixed limit value, while the melting point of the alloy becomes gradually lower thus the amount of the evaporation of gold during the high temperature operation increases disadvantageously. If the alloy contains gold in an amount exceeding the aforesaid maximum limit, the machinability is degraded and such undesirable defects as cracking take place to make the nozzle plate unusable.

On the other hand, if the palladium content is increased, the machinability is improved and the resistance to wetting is decreased. The ratio of the palladium content to the gold content has a great influence on the resistance to wetting and machinability. When the gold content is large and the palladium content is small, the resistance to wetting is improved and the machinability is degraded. And when the palladium content is large and the gold content is small, machinability is improved and the resistance to wetting is degraded.

The smaller is the amount of platinum contained in the alloy, the lower is the melting point of the alloy. However, in the present invention, no problem arises in the performance of the nozzle plate as long as the platinum content of the alloy remains within the specified range. Taking all of the above described facts into consideration, it can be said that, in platinum-gold-rhodium alloys, rhodium and gold are only soluble with difficulty in each other in the solid state, and even in platinum-gold system alloys, the solid solubility limit for gold is about 4 percent, these facts lead to the conclusion that, in the case of the above alloys, solid solution alloys are obtained only with difficulty. It can also be said that, in the above alloys, the machinability is degraded because the crystal grains grow fast and become coarse readily.

By contrast, in the platinum-gold-palladium system alloys according to the present invention, both the platinum-palladium system and the gold-palladium system form continuous complete solid solutions, and the palladium plays a role of dissolving the platinum in the gold in the solid state and vice versa, with the result that complete solid solution type alloys are obtained with great ease and the machinability is enhanced.

Hereinafter the present invention will be explained with reference to the embodiments thereof.

EMBODIMENT 1

An alloy containing 90 percent by weight platinum, 5 percent by weight gold, and 5 percent by weight palladium was melted under vacuum in an alumina crucible to produce an ingot. A nozzle plate was made by rolling the ingot weighing 1200 g. into a nozzle plate blank of 2 mm. thick, and machining 4000 nozzle holes in the nozzle plate blank having a nozzle hole density of 34 nozzle holes per square centimeter.

No cracking occurred during the processing. Glass fibers were spun with the use of this nozzle plate, and it was found that this nozzle plate can be used continuously for a period of time of 3 months or more.

A publicly known alloy containing 85.5 percent by weight platinum, 9.5 percent by weight rhodium, and 5 percent by weight gold was melted under vacuum in an alumina crucible to produce an ingot. A nozzle plate blank was manufactured by rolling the ingot weighing 1200 g. to a thickness of 2 mm. However, small cracks were formed in the nozzle plate blank during the rolling operation, thus it was impossible to use the nozzle plate blank until it was repaired.

Of these cracks, the visible ones were repaired by welding all the surfaces of the nozzle plate. However, invisible cracks deep in the nozzle plate were propagated by the expansion and contraction of the nozzle plate due to temperature changes during the operation, resulting in a leakage of the molten glass. It was thus impossible to prepare a practical nozzle plate having 800 or more nozzle holes.

EMBODIMENT 2

Three flat nozzle plates were manufactured of three different alloys according to the present invention, which had three different chemical compositions, and measurements were taken of the contact angles between the above flat nozzle plates and molten glass at temperatures in the range from 1100° C. The results are given in the table below in comparison with the contact angle between a nozzle plate made of the publicly known platinum-rhodium-gold system alloy and the above molten glass. In the table, the specimen No. 4 is an alloy containing platinum in an amount below the range used in the present invention and gold in an amount exceeding the above range.

| No. | Alloy Composition (% by weight) | | | | Contact Angle |
|---|---|---|---|---|---|
| | Pt | Rh | Pd | Au | |
| 1 | 90 | — | 5 | 5 | 72°–77° |
| 2 | 85 | — | 10 | 5 | 60°–65° |
| 3 | 85 | — | 6 | 9 | 73°–78° |
| 4 | 80 | — | 8 | 12 | 75°–80° |
| 5 | 85.5 | 9.5 | — | 5 | 76°–81° |

As can be seen from the table, the contact angles between the nozzle plates made of the alloys of the present invention and molten glass are substantially equal to the contact angle between the nozzle plate made of the publicly known platinum-rhodium-gold alloy and the molten glass, while the nozzle plates made of the alloys of the present invention showed excellent machinability and superior nozzle plate performance, as was the case with Embodiment 1.

In this connection, it should be recalled that the contact angle between a nozzle plate made of an alloy containing 80 percent by weight gold and 20 percent by weight palladium and the molten glass is in the range from 81 to 86 degrees, and the contact angle between a nozzle plate made of an alloy containing 60 percent by weight gold and 40 percent by weight palladium and the molten glass is in the range from 51 to 57 degrees.

As has been described in detail in the foregoing, the alloy according to the present invention has an excellent resistance to wetting by the molten glass and an improved machinability, and due to these features enjoys advantages that a nozzle plate can be manufactured very readily by the use of the alloy of the present invention because no small cracks are formed in the nozzle plate during the processing and an increased number of nozzle holes can be machined with ease in the nozzle plate, and that the nozzle plate made of the alloy of the present invention can be used for a longer period of use for spinning glass fibers.

Various modifications in the disclosed embodiments can be made by one skilled in the art without departing from the scope of the invention as defined by the claims.

We claim:

1. A nozzle plate for spinning glass fibers made of an alloy consisting essentially of between 82 and 92 percent by weight platinum, between 3 and 10 percent by weight gold, and between 3 and 12 percent by weight palladium, the plate having nozzle holes at a predetermined pitch.

2. A nozzle plate for spinning glass fibers in accordance with claim 1 consisting essentially of 90 percent by weight platinum, 5 percent by weight gold, and 5 percent by weight palladium.

3. A nozzle plate for spinning glass fibers in accordance with claim 1 consisting essentially of 85 percent by weight platinum, 5 percent by weight gold, and 10 percent by weight palladium.

4. A nozzle plate for spinning glass fibers in accordance with claim 1 consisting essentially of 85 percent by weight platinum, 9 percent by weight gold, and 6 percent by weight palladium.

5. A method for making a nozzle plate for spinning glass fibers comprising the steps of preparing a flat nozzle plate blank made of Pt-Au-Pd ternary alloy consisting essentially of between 82 and 92 percent by weight platinum, between 3 and 10 percent by weight gold, and between 3 and 12 percent by weight palladium, and forming a required number of nozzle holes at a predetermined pitch in the plate.

6. The method of claim 5 wherein the alloy consists essentially of 90 percent by weight platinum, 5 percent by weight gold, and 5 percent by weight palladium.

7. The method of claim 5 wherein the alloy consists essentially of 85 percent by weight platinum, 5 percent by weight gold, and 10 percent palladium.

8. The method of claim 5 wherein the alloy consists essentially of 85 percent by weight platinum, 9 percent by weight gold, and 6 percent by weight palladium.

* * * * *